US012665105B2

(12) United States Patent
Fukuda et al.

(10) Patent No.: US 12,665,105 B2
(45) Date of Patent: Jun. 23, 2026

(54) RESIN SHEET FOR FLEXIBLE FLAT CABLE AND FLEXIBLE FLAT CABLE

(71) Applicant: Sumitomo Electric Industries, Ltd., Osaka (JP)

(72) Inventors: Yutaka Fukuda, Osaka (JP); Tatsuo Matsuda, Kanuma (JP); Chiaki Kojima, Kanuma (JP); Shoei Yonezawa, Kanuma (JP)

(73) Assignee: SUMITOMO ELECTRIC INDUSTRIES, LTD., Tokyo (JP)

( * ) Notice: Subject to any disclaimer, the term of this patent is extended or adjusted under 35 U.S.C. 154(b) by 184 days.

(21) Appl. No.: 18/701,824

(22) PCT Filed: Oct. 11, 2022

(86) PCT No.: PCT/JP2022/037886

§ 371 (c)(1),
(2) Date: Apr. 16, 2024

(87) PCT Pub. No.: WO2023/068110

PCT Pub. Date: Apr. 27, 2023

(65) Prior Publication Data

US 2024/0420867 A1 Dec. 19, 2024

(30) Foreign Application Priority Data

Oct. 18, 2021 (JP) ................................ 2021-170555

(51) Int. Cl.
*H01B 7/08* (2006.01)

(52) U.S. Cl.
CPC ......... *H01B 7/0861* (2013.01); *H01B 7/0823* (2013.01)

(58) Field of Classification Search
CPC .......... H01B 7/02; H01B 7/0216; H01B 7/08; H01B 7/0823; H01B 7/0838; H01B 7/0861; H01B 7/18; H01B 7/29; H01B 7/295
USPC ........ 174/102 R, 103, 104, 105 R, 108, 109, 174/110 R–110 PM, 112, 113 R, 174/117 R–11 FF
See application file for complete search history.

(56) References Cited

U.S. PATENT DOCUMENTS

2011/0232938 A1* 9/2011 Kodama .............. H01B 7/0838 174/117 F
2012/0037410 A1 2/2012 Amou et al.
(Continued)

FOREIGN PATENT DOCUMENTS

JP 2004-335263 A 11/2004
JP 2008-047505 A 2/2008
(Continued)

*Primary Examiner* — William H. Mayo, III
(74) *Attorney, Agent, or Firm* — Volpe Koenig

(57) ABSTRACT

A resin sheet for a flexible flat cable is layered between a plurality of conductors arranged in parallel and a shield layer layered on the outer surface side of the plane in which the plurality of conductors are arranged in parallel, and has one or more insulating layers. The resin sheet for a flexible flat cable has a base insulating layer that has a tensile elastic modulus of 40-450 MPa, a dielectric loss tangent of at most 0.0014, and a relative permittivity of at most 2.3 at 25° C. and 10 GHZ, and that contains an olefin-based thermoplastic elastomer as the main component thereof. The average thickness of the base insulating layer is 20-450 μm.

5 Claims, 6 Drawing Sheets

(56) References Cited

U.S. PATENT DOCUMENTS

| | | | | |
|---|---|---|---|---|
| 2019/0371494 | A1 * | 12/2019 | Kojima ................ | H01B 7/0838 |
| 2021/0090761 | A1 * | 3/2021 | Kojima ................ | H01B 13/016 |

FOREIGN PATENT DOCUMENTS

| | | | | | |
|---|---|---|---|---|---|
| JP | 2012-041372 | A | | 3/2012 | |
| JP | 6342044 | B1 | | 6/2018 | |
| WO | WO-2018159489 | A1 | * | 9/2018 | ............... H01B 7/18 |
| WO | WO-2019049922 | A1 | * | 3/2019 | ............. H01B 17/62 |

* cited by examiner

RESIN SHEET FOR FLEXIBLE FLAT CABLE AND FLEXIBLE FLAT CABLE

TECHNICAL FIELD

The present disclosure relates to a resin sheet for a flexible flat cable and a flexible flat cable.

This application claims priority based on Japanese Patent Application No. 2021-170555 filed on Oct. 18, 2021, the entire contents of which are incorporated herein by reference.

BACKGROUND ART

A flexible flat cable of multi-core flat type is used as a wire for internal wiring in an electronic device. The flexible flat cable is manufactured by interposing a plurality of strip-shaped conductors arranged in parallel between two insulating resin sheets and integrating the conductors and the insulating resin sheets by a pressure heating step such as a thermal lamination step.

In particular, in digital equipment and the like, the flexible flat cable is used to transmit a digital signal. For the transmission of the digital signal, electromagnetic noise is preferably blocked from the outside. Therefore, a flexible flat cable in which conductive shield layers are layered on the outer surfaces of the resin sheets is often used. Furthermore, in order to accurately transmit a high-frequency signal, it is necessary to improve dielectric characteristics.

As a conventional flexible flat cable, it has been proposed to increase a characteristic impedance between the conductors and the shield layers by interposing low relative dielectric constant layers containing polyolefin as a primary component between the insulating resin sheets containing polyester as a primary component and the shield layers (refer to Japanese Unexamined Patent Application Publication No. 2008-047505).

CITATION LIST

Patent Literature

PTL 1: Japanese Unexamined Patent Application Publication No. 2008-047505

SUMMARY OF THE INVENTION

A resin sheet for a flexible flat cable according to the present disclosure includes one or a plurality of insulating layers and is layered between a plurality of conductors arranged in parallel and a shield layer layered on an outer surface side of parallel arranged surfaces of the plurality of conductors. The resin sheet has a relative dielectric constant of 2.3 or less at 25° C. and 10 GHZ, and a dielectric loss tangent of 0.0014 or less. The resin sheet has a tensile elastic modulus of 40 MPa to 450 MPa. The resin sheet includes a base insulating layer containing a thermoplastic olefinic elastomer as a primary component. An average thickness of the base insulating layer is 20 μm to 450 μm.

DETAILED DESCRIPTION

Figure 1:
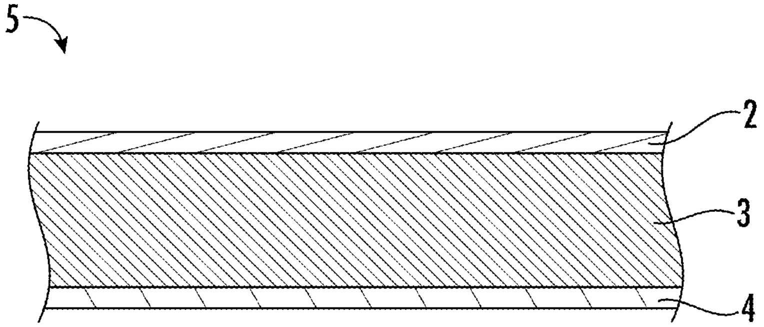
FIG. 1 is a schematic cross-sectional view showing a resin sheet for a flexible flat cable according to an embodiment of the present disclosure.

Problems to be Solved by Present Disclosure

Since such a flexible flat cable is required to have flame retardancy, the resin sheet for the flexible flat cable needs to contain a flame retardant. Therefore, in the configuration of the resin sheets for the flexible flat cable as disclosed in the above-mentioned conventional art, since the resins arranged around the conductors contain the flame retardant, the relative dielectric constant cannot be sufficiently lowered, and thus, dielectric loss is likely to occur in the transmission of a high-frequency signal. Furthermore, the resin sheet containing the flame retardant tends to reduce the flexibility. In addition, even in the resin sheet without the flame retardant, when polyolefin such as polyethylene or polypropylene having good dielectric characteristics is used for the low relative dielectric constant layer, the flexible flat cable becomes stiffer and bending is likely to be difficult.

The present disclosure has been made in view of the above circumstances, and an object of the present disclosure is to provide a resin sheet for a flexible flat cable having good dielectric characteristics and excellent flexibility and dimensional stability.

Advantageous Effects of Present Disclosure

According to the present disclosure, a resin sheet for a flexible flat cable having good dielectric characteristics and excellent flexibility and dimensional stability can be provided.

DESCRIPTION OF EMBODIMENTS OF PRESENT DISCLOSURE

First, embodiments according to the present disclosure will be listed and described.

A resin sheet for a flexible flat cable according to the present disclosure includes one or a plurality of insulating layers and is layered between a plurality of conductors arranged in parallel and a shield layer layered on an outer surface side of parallel arranged surfaces of the plurality of conductors. The resin sheet has a relative dielectric constant of 2.3 or less at 25° C. and 10 GHZ, a dielectric loss tangent of 0.0014 or less, and a tensile elastic modulus of 40 MPa to 450 MPa. The resin sheet includes a base insulating layer containing a thermoplastic olefinic elastomer as a primary component. An average thickness of the base insulating layer is 20 μm to 450 μm.

The resin sheet for a flexible flat cable includes a base insulating layer containing a thermoplastic olefinic elastomer (TPO) as a primary component, and the average thickness of the base insulating layer is 20 μm to 450 μm. This can reduce the relative dielectric constant and the dielectric loss tangent while ensuring flexibility. In addition, the resin sheet for a flexible flat cable has a relative dielectric constant of 2.3 or less at 25° C. and 10 GHZ, a dielectric loss tangent of 0.0014 or less, and a tensile elastic modulus of 40 MPa to 450 MPa. Thus, the resin sheet for a flexible flat cable has good dielectric characteristics as well as excellent flexibility and dimensional stability.

Each of the "relative dielectric constant" and the "dielectric loss tangent" is a value measured under the condition of a temperature of 25° C. and a frequency of 10 GHZ, by a cavity resonator perturbation method in accordance with JIS-C-2138 (2007). In addition, the term "parallel arranged surfaces" refers to surfaces parallel to the parallel direction in which conductors are arranged, among the surfaces of the plurality of conductors. The term "primary component" refers to a component having a content ratio of 50% by mass or more, and preferably 90% by mass or more. The term "average thickness" refers to an average value of thicknesses at any 10 points. The term "tensile elastic modulus" is a complex elastic modulus representing a relationship between tensile stress and strain. The tensile elastic modulus is a value measured by a tensile testing apparatus in accordance with JIS-K-7161-1:2014 "Plastics-Determination of tensile properties-Part 1: General principles".

The thermoplastic olefinic elastomer may be a reactor thermoplastic olefinic elastomer (hereinafter, also referred to as a reactor TPO) having a polypropylene block. When the thermoplastic olefinic elastomer is the reactor TPO having a polypropylene block, the relative dielectric constant and the dielectric loss tangent can be further reduced, and the dielectric characteristics of the resin sheet for a flexible flat cable can be further enhanced.

The resin sheet for a flexible flat cable may further include a shield-layer-side insulating layer layered on a surface of the base insulating layer which is on a side of the shield layer. The shield-layer-side insulating layer may have a tensile elastic modulus of 400 MPa or more. In the resin sheet for a flexible flat cable, the tensile elastic modulus of the shield-layer-side insulating layer serving as the surface layer is 400 MPa or more, and thus the handleability during the manufacture and transportation can be improved.

The resin sheet for a flexible flat cable may further include a conductor-side insulating layer layered on a surface of the base insulating layer which is on a side of the conductors. The conductor-side insulating layer may have an average thickness of 3 μm to 20 μm. When the average thickness of the conductor-side insulating layer is within the above range, adhesive strength to the conductor and transmission characteristics can be improved.

A flexible flat cable according to the present disclosure includes a plurality of conductors arranged in parallel, a shield layer layered on an outer surface side of parallel arranged surfaces of the plurality of conductors, and the resin sheet for the flexible flat cable layered between the parallel arranged surfaces of the plurality of conductors and the shield layer. The resin sheet for the flexible flat cable and surfaces of the plurality of conductors are in contact with each other.

The flexible flat cable according to the present disclosure includes the resin sheet for the flexible flat cable according to the present disclosure having good dielectric characteristics and excellent flexibility and dimensional stability, and thus has excellent dielectric characteristics, and is flexible and excellent in bending performance.

DETAILS OF EMBODIMENTS OF PRESENT DISCLOSURE

Hereinafter, embodiments of a resin sheet for a flexible flat cable and a flexible flat cable according to the present disclosure will be described in detail with reference to the drawings. It should be noted that each of the embodiments of the resin sheet for a flexible flat cable and the flexible flat cable according to the present disclosure is not limited to the dimensions shown in the drawings.

<Resin Sheet for Flexible Flat Cable>

A resin sheet 5 for a flexible flat cable in FIG. 1 includes a shield-layer-side insulating layer 2 disposed on a side of the shield layer of the flexible flat cable, a base insulating layer 3 layered on an inner surface side of shield-layer-side insulating layer 2, and a conductor-side insulating layer 4 layered on an inner surface side of base insulating layer 3 and disposed on a side of the conductors of the flexible flat cable.

Here, the term "outer surface side" and the term "inner surface side" are defined such that, when the flexible flat cable is provided with the resin sheet for the flexible flat cable, the side closer to the plurality of conductors is referred to as the "inner surface side" and the opposite side is referred to as the "outer surface side".

Resin sheet 5 for a flexible flat cable is a layer for ensuring the pressure resistance and dielectric characteristics of the flexible flat cable. Resin sheet 5 for the flexible flat cable electrically insulates a plurality of flat rectangular conductors 10 from one another, and functions as a capacitor that forms electrostatic coupling by being interposed between flat rectangular conductors 10 and between flat rectangular conductors 10 and shield layer 12 for use in a high-frequency region.

Resin sheet 5 for a flexible flat cable is also called a dielectric, and the dielectric loss tangent (tan δ) of the resin material forming resin sheet 5 for a flexible flat cable is a parameter that affects the transmission characteristics of the flexible flat cable. The upper limit of the dielectric loss tangent of resin sheet 5 for a flexible flat cable is 0.0014 from the viewpoint of improving the dielectric characteristics and reducing the dielectric loss (insertion loss), and may be 0.0010.

The upper limit of a relative dielectric constant of resin sheet 5 for a flexible flat cable is 2.3 from the viewpoint of improving the dielectric characteristics and reducing the dielectric loss (insertion loss), and may be 2.2.

The lower limit of a tensile elastic modulus of resin sheet 5 for a flexible flat cable is 40 MPa, and may be 100 MPa. On the other hand, the upper limit of the tensile elastic modulus is 450 MPa, and may be 400 MPa. By setting the tensile elastic modulus to 40 MPa to 450 MPa, the strength and the dimensional stability of resin sheet 5 for a flexible flat cable can be improved in a well-balanced manner, and the flexibility can be improved.

Resin sheet 5 for a flexible flat cable does not contain a flame retardant. When resin sheet 5 for a flexible flat cable is formed of a resin material containing no flame retardant, the dielectric loss tangent is reduced, and as a result, the dielectric loss can be reduced, in particular, for a high-frequency signal.

[Shield-Layer-Side Insulating Layer]

Shield-layer-side insulating layer 2 includes a resin. A primary component of shield-layer-side insulating layer 2 is, for example, polyolefin. Examples of the polyolefin include homopolymers of olefins such as ethylene, propylene, butene, and hexene, copolymers of the above monomers, and copolymers of the above monomers and non-olefin monomers. Specific examples of the polyolefin include ethylene-based resins such as low-density polyethylene, linear polyethylene (ethylene-α-olefin copolymer), and high-density polyethylene; propylene-based resins such as polypropylene and ethylene-propylene copolymer; poly (4-methylpentene-1); poly (buten-1); ethylene-vinyl acetate copolymer; and acid-modified polyolefin resins obtained by subjecting the above resins to a modification (treatment) with maleic anhydride. In particular, as the primary component of shield-layer-side insulating layer 2, in order to improve the adhesive strength between an adhesive layer 13 and base insulating layer 3, acid-modified polyolefin is preferable, and acid-modified polypropylene is more preferable. The entire resin may be formed of only the primary component.

The lower limit of a tensile elastic modulus of shield-layer-side insulating layer 2 is preferably 400 MPa, and may be 420 MPa. On the other hand, the upper limit of the tensile elastic modulus of shield-layer-side insulating layer 2 is preferably, for example, 2000 MPa. By setting the tensile elastic modulus to be 400 MPa to 2000 MPa, the handleability of resin sheet 5 for a flexible flat cable during manufacturing and transportation can be improved.

The lower limit of an average thickness of shield-layer-side insulating layer 2 may be 3 μm or 5 μm. On the other hand, the upper limit of the average thickness of shield-layer-side insulating layer 2 may be 20 μm or 15 μm. When the average thickness of shield-layer-side insulating layer 2 is less than 3 μm, it is not easy to form a uniform layer, and the adhesive strength with adhesive layer 13 may be reduced. When the average thickness of shield-layer-side insulating layer 2 exceeds 20 μm, the transmission characteristics of resin sheet 5 for a flexible flat cable may be deteriorated.

[Base Insulating Layer]

Base insulating layer 3 contains a thermoplastic olefinic elastomer as a primary component. The thermoplastic olefinic elastomer has polyolefin as a hard segment and a rubber component such as an olefinic rubber as a soft segment. Examples of the polyolefin include polypropylene (PP) and polyethylene (PE). Examples of the olefin-based rubber include ethylene-propylene rubber (EPM) and ethylene-propylene-diene terpolymer (EPDM). Examples of the thermoplastic olefinic elastomer include a blend type of polyolefin and an olefin-based rubber component, a dynamic crosslinking type in which crosslinking rubber particles are finely dispersed in polyolefin by vulcanizing the olefin-based rubber component when mixing polyolefin and the olefin-based rubber component, and the reactor TPO which is a polymerization type of polyolefin and olefin-based rubber. Among these types, the reactor TPO having a polypropylene block is preferable as the thermoplastic olefinic elastomer. When the thermoplastic olefinic elastomer is the reactor TPO having a polypropylene block, the relative dielectric constant and the dielectric loss tangent can be further reduced, and the dielectric characteristics of resin sheet 5 for a flexible flat cable can be further enhanced.

The melting point of the thermoplastic olefinic elastomer may be 100° C. to 180° C. When the melting point of the thermoplastic olefinic elastomer is 100° C. to 180° C. the thermoplastic olefinic elastomer can be used even in a high-temperature environment. The "melting temperature" is a value measured in accordance with JIS-K7121 (1987).

The lower limit of the relative dielectric constant of the thermoplastic olefinic elastomer is not particularly limited, but may be, for example, 2.0. The upper limit of the relative dielectric constant of the thermoplastic olefinic elastomer may be 3.0. When the relative dielectric constant of the thermoplastic olefinic elastomer is 2.0 to 3.0, the dielectric loss can be reduced while the strength is maintained.

The lower limit of the dielectric loss tangent of the thermoplastic olefinic elastomer is not particularly limited, but may be, for example, 0.0001. The upper limit of the dielectric loss tangent of the thermoplastic olefinic elastomer may be 0.001. When the dielectric loss tangent of the thermoplastic olefinic elastomer is 0.0001 to 0.001, the dielectric loss can be reduced while the strength is maintained.

The lower limit of an average thickness of base insulating layer 3 is 20 μm, and may be 30 μm. On the other hand, the upper limit of the average thickness of base insulating layer 3 is 450 μm, may be 350 μm, may be 300 μm, may be 280 μm, and may be 250 μm. When the average thickness of base insulating layer 3 is less than 20 μm, the handleability of resin sheet 5 for a flexible flat cable may be lowered. When the average thickness of base insulating layer 3 exceeds 450 μm, the flexibility of resin sheet 5 for a flexible flat cable may be insufficient.

[Conductor-Side Insulating Layer]

Conductor-side insulating layer 4 contains a resin as a primary component. Resin sheet 5 for the flexible flat cable includes conductor-side insulating layer 4, thereby improving the adhesive strength with the conductors. As the resin used as the primary component of conductor-side insulating layer 4, the thermoplastic olefinic elastomer as described in base insulating layer 3 can be used from the viewpoint of adhesiveness to the conductors, a lower relative dielectric constant, and cost.

The lower limit of an average thickness of conductor-side insulating layer 4 may be 3 μm or 5 μm. On the other hand, the upper limit of the average thickness of conductor-side insulating layer 4 may be 20 μm or 15 μm. When the average thickness of conductor-side insulating layer 4 is less than 3 μm, the adhesive strength to the conductors may be reduced. When the average thickness of conductor-side insulating layer 4 exceeds 20 μm, the transmission characteristics of resin sheet 5 for a flexible flat cable may be deteriorated.

[Method of Manufacturing Resin Sheet for Flexible Flat Cable]

A method of manufacturing resin sheet 5 for a flexible flat cable includes a step of preparing resin compositions for forming shield-layer-side insulating layer 2, base insulating layer 3, and conductor-side insulating layer 4, and a step of forming sheets for constituting shield-layer-side insulating layer 2, base insulating layer 3, and conductor-side insulating layer 4 from the respective resin compositions.

(Resin Composition Preparation Step)

Each of the resin compositions for forming shield-layer-side insulating layer 2, base insulating layer 3, and conductor-side insulating layer 4 can be prepared by kneading a composition containing a resin and other optional components such as an antioxidant, a pigment, a processing aid, and an anti-blocking agent with a kneader. Examples of the kneader include an open roll, a kneading machine, and a two axis mixing extruder.

(Sheet Forming Step)

Shield-layer-side insulating layer 2, base insulating layer 3, and conductor-side insulating layer 4 can be formed by a melt extrusion method such as a T-die method or an inflation method. Shield-layer-side insulating layer 2, base insulating layer 3, and conductor-side insulating layer 4 may be formed as separate sheets or may be formed as an integrated three-layered sheet by co-extrusion.

(Thermocompression Bonding Step)

The three separate sheets or one three-layered sheet formed as described above is integrated by thermocompression bonding to form resin sheet 5 for a flexible flat cable. The thermocompression bonding can be performed using, for example, a heating laminator equipped with a heating roller, a heating press machine, or the like. The heating temperature is, for example, about 80° C. to 200° C. Alternatively, shield-layer-side insulating layer 2 and conductor-side insulating layer 4 may be formed by applying a solution to base insulating layer 3 and drying the solution.

<Flexible Flat Cable>

Figure 2:
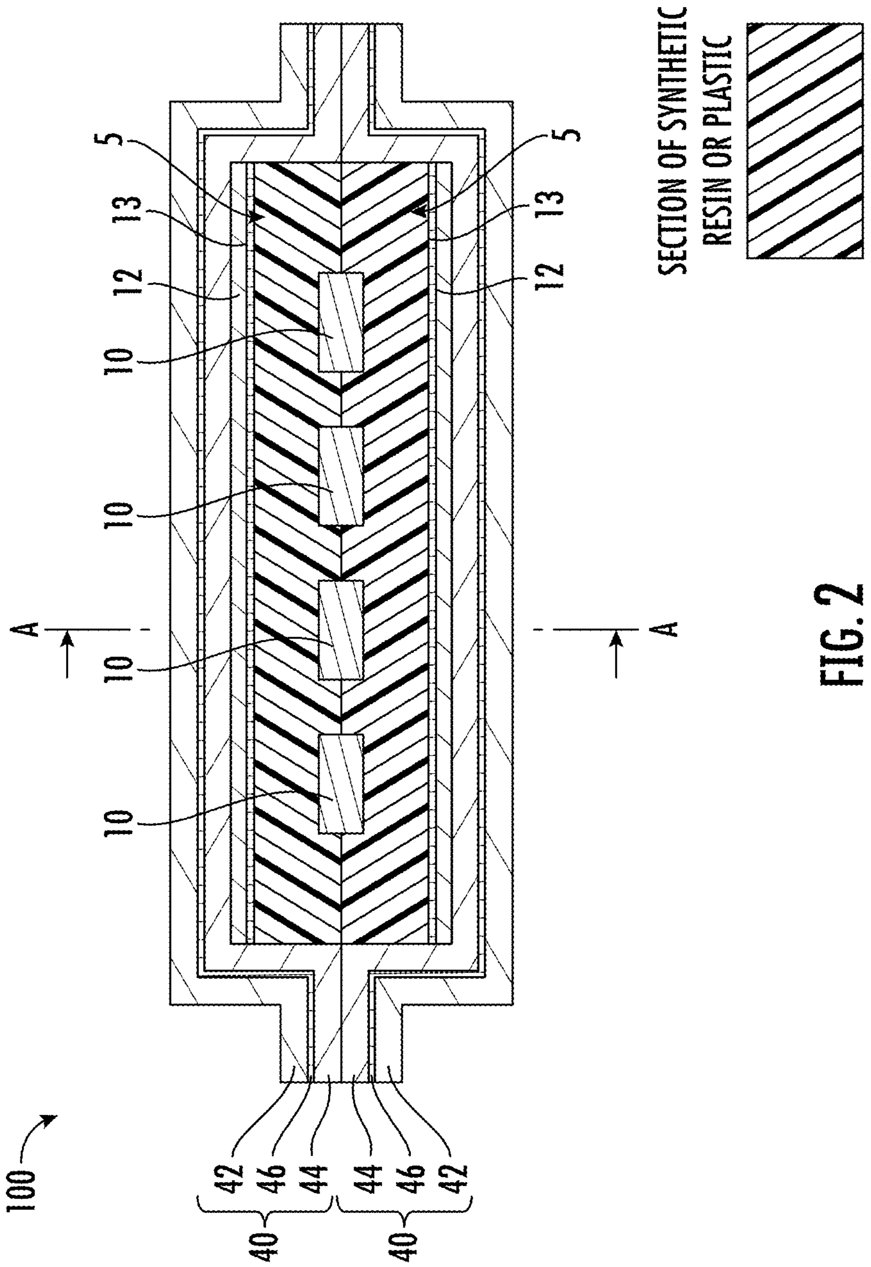
FIG. 2 is a schematic cross-sectional view of a flexible flat cable according to an embodiment of the present disclosure in a plane perpendicular to a longitudinal direction of the flexible flat cable.
Figure 3:
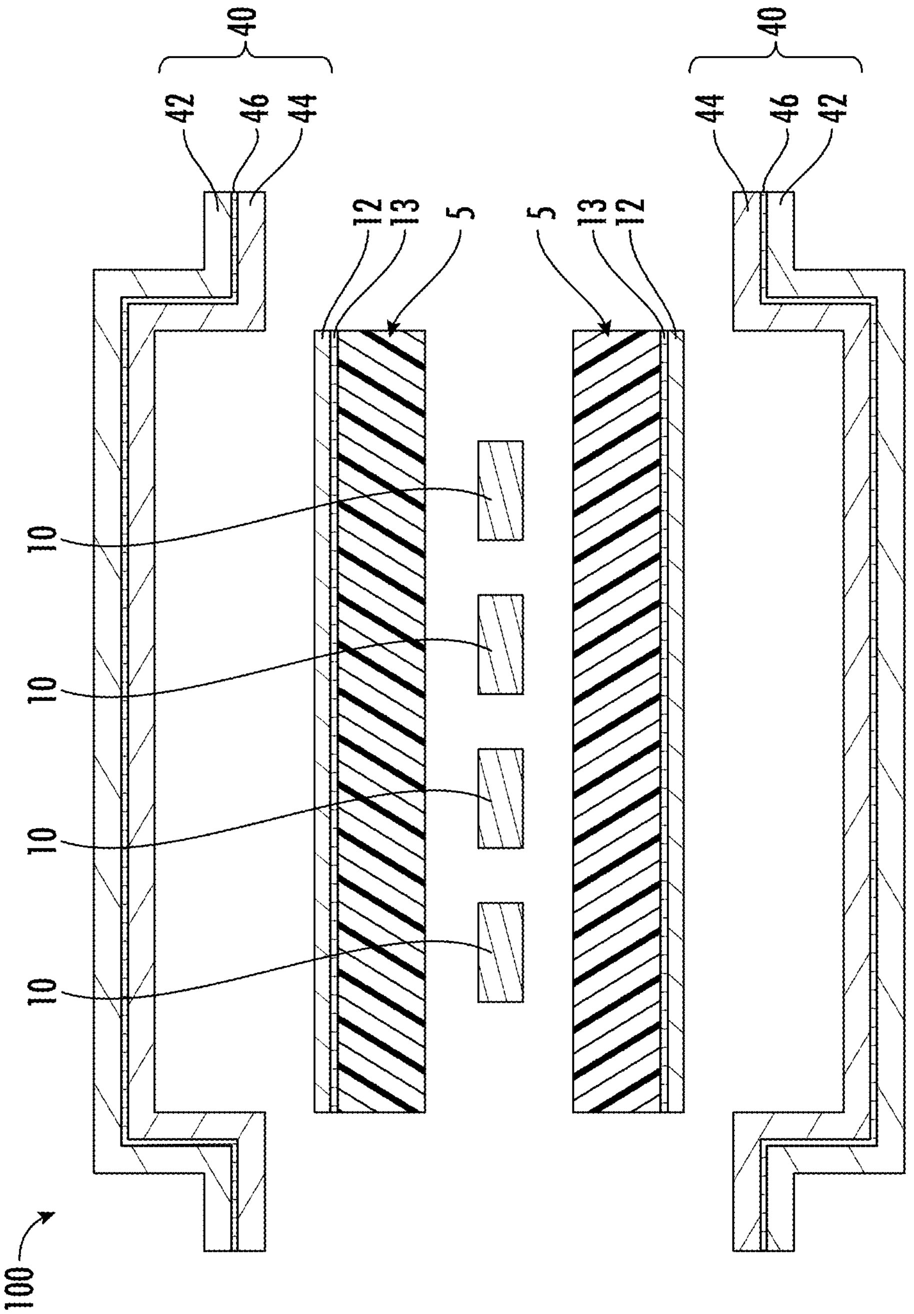
FIG. 3 is a schematic exploded cross-sectional view of the flexible flat cable according to an embodiment of the present disclosure in the plane perpendicular to the longitudinal direction of the flexible flat cable.

FIG. 2 is a cross-sectional view (a transverse cross-sectional view) of a flexible flat cable according to the present embodiment in a direction perpendicular to a longitudinal direction of the flexible flat cable. FIG. 3 is a schematic exploded cross-sectional view of the flexible flat cable according to the present embodiment in a plane perpendicular to the longitudinal direction of the flexible flat cable. The flexible flat cable according to the embodiment is a cable used for electrically connecting devices or for wiring in devices.

A flexible flat cable 100 shown in FIGS. 2 and 3 includes a plurality of flat rectangular conductors 10 arranged in parallel, a pair of resin sheets 5 for the flexible flat cable, a pair of shield layers 12 in contact with the pair of resin sheets 5 for the flexible flat cable on the outer surface sides through adhesive layers 13, and a pair of covering sheets 40 covering the outer surfaces of the pair of shield layers 12.

The average thickness of flexible flat cable 100 can be, for example, 100 μm to 900 μm.

[Conductor]

The plurality of band-shaped flat rectangular conductors 10 have a stripe pattern arranged in parallel to one another. The plurality of flat rectangular conductors 10 are made of a conductive metal such as copper, tin-plated annealed copper, or nickel-plated annealed copper. The plurality of flat rectangular conductors 10 may be formed of a foil-like conductive metal. Flat rectangular conductors 10 are formed in substantially flat rectangular shapes in cross section. In the present embodiment, flexible flat cable 100 includes four flat rectangular conductors 10, but the number of flat rectangular conductors 10 may be set as desired. Furthermore, flexible flat cable 100 in the present embodiment includes the plurality of flat rectangular conductors 10, but the cross-sectional shapes of the conductors are not particularly limited.

The lower limit of an average thickness of the plurality of flat rectangular conductors 10 may be 15 μm or 25 μm. On the other hand, the upper limit of the average thickness of the plurality of flat rectangular conductors 10 may be 150 μm or 100 μm. When the average thickness of the plurality of flat rectangular conductors 10 is less than 15 μm, the plurality of flat rectangular conductors 10 may have an insufficient mechanical strength and may break. When the average thickness of the plurality of flat rectangular conductors 10 exceeds 150 μm, flexible flat cable 100 may be unnecessarily thick or may have an insufficient flexibility.

[Resin Sheet for Flexible Flat Cable]

As shown in FIGS. 2 and 3, resin sheets 5 for the flexible flat cable are layered between the plurality of conductors 10 arranged in parallel and shield layers 12 layered on the outer surface sides of the parallel arranged surfaces of the plurality of conductors 10. In other words, the pair of resin sheets 5 for the flexible flat cable are layered between the plurality of conductors 10 arranged in parallel and shield layers 12 that are layered on the outer surface sides of the parallel arranged surfaces of the plurality of flat rectangular conductors 10. Resin sheets 5 for the flexible flat cable are layers for ensuring the pressure resistance and the high-frequency characteristics of flexible flat cable 100. Flexible flat cable 100 includes resin sheets 5 for the flexible flat cable having good dielectric characteristics and excellent flexibility and dimensional stability, and thus has excellent dielectric characteristics, and is flexible and excellent in bending performance. The configurations of resin sheets 5 for the flexible flat cable are as described above, and thus a redundant description thereof will be omitted.

In the present embodiment, the pair of resin sheets 5 for the flexible flat cable are layered on both surface sides of the plurality of flat rectangular conductors 10 so that conductor-side insulating layers 4 shown in FIG. 1 are in contact with the plurality of flat rectangular conductors 10, and are bonded to each other by thermocompression bonding. By this thermocompression bonding, conductor-side insulating layers 4 of two resin sheets 5 for the flexible flat cable are filled between flat rectangular conductors 10 and are bonded to each other to be integrated. The expression "filled between flat rectangular conductors 10" means that the insulating layer of resin sheet 5 for the flexible flat cable is present in gaps between flat rectangular conductors 10. Thus, resin sheets 5 for the flexible flat cable are in contact with the surfaces of the plurality of flat rectangular conductors 10. In other words, the plurality of flat rectangular conductors 10 are covered with the pair of resin sheets 5 for the flexible flat cable. In addition, the pair of resin sheets 5 for the flexible flat cable may be the same as each other, or may be different from each other in the material and thickness of each laver.

[Shield Layer]

The pair of shield layers 12 are layers having a shield function for noise countermeasures and securing high-frequency characteristics of flexible flat cable 100, and are formed of, for example, a metal foil such as a copper foil or an aluminum foil. Adhesive layers 13 for bonding resin sheets 5 for the flexible flat cable and shield layers 12 are provided between resin sheets 5 for the flexible flat cable and shield layers 12. As adhesive layers 13, for example, an olefin-based adhesive such as ethylene-vinyl acetate copolymer (EVA), ethylene-ethyl acrylate copolymer (EEA), maleic acid-modified polyethylene, or maleic acid-modified polypropylene can be used.

Figure 4:
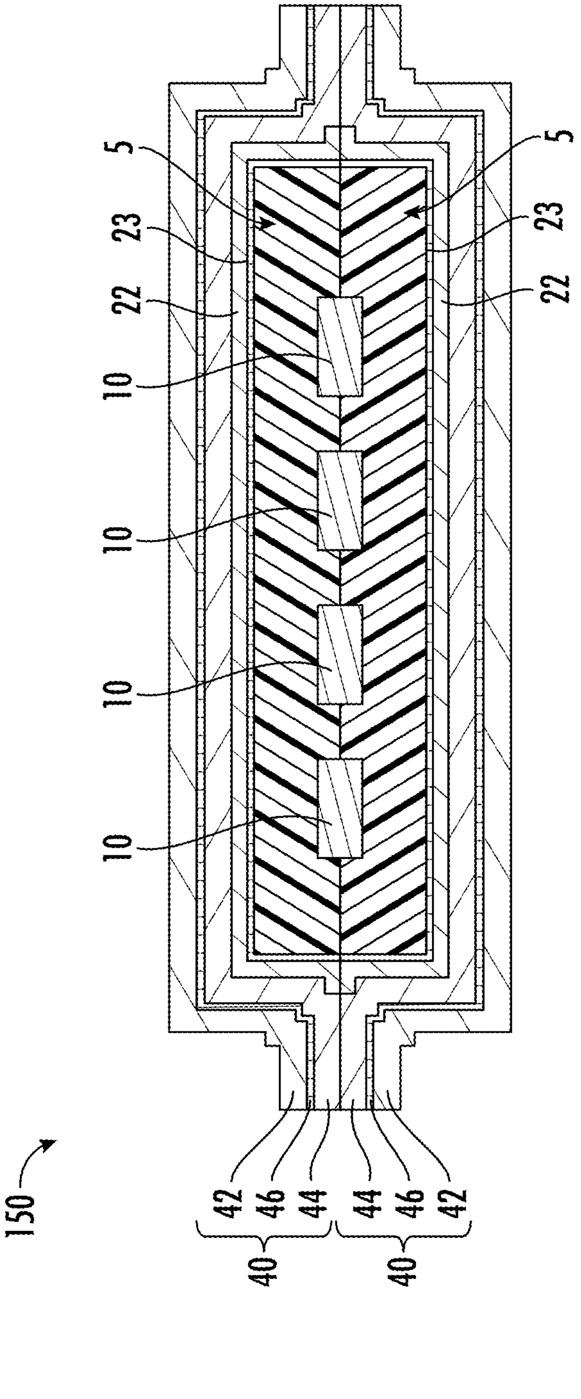
FIG. 4 is a schematic cross-sectional view of a flexible flat cable according to another embodiment of the present disclosure in a plane perpendicular to a longitudinal direction of the flexible flat cable.

The pair of shield layers 12 are layered on the surfaces of respective adhesive layers 13 arranged on the outer surface sides of the parallel arranged surfaces of flat rectangular conductors 10. In the present embodiment, the pair of shield layers 12 are layered on resin sheets 5 for the flexible flat cable through adhesive layers 13 such that both end portions of shield layers 12 in the parallel direction (hereinafter, referred to as a conductor parallel direction) of flat rectangular conductors 10 substantially aligned with both end portions of resin sheets 5 for the flexible flat cable in the conductor parallel direction. The shield layers may be layered so as to surround the entire periphery of the resin sheets for the flexible flat cable. FIG. 4 is a schematic cross-sectional view of a flexible flat cable with a modification of the shield layer. As shown in FIG. 4, in a flexible flat cable 150, the pair of shield layers 22 are layered so as to surround the entire periphery of resin sheets 5 for the flexible flat cable through adhesive layers 23. As described above, flexible flat cable 150 includes shield layers 22, and thus it is possible to maintain good noise resistance and high frequency characteristics of flexible flat cable 150.

[Resin Sheet]

As shown in FIG. 2, the pair of covering sheets 40 each include a base layer 42, a flame-retardant insulating layer 44, and an anchor coat layer 46. Base layer 42 is a layer for ensuring the pressure resistance of flexible flat cable 100, and is formed of, for example, polyethylene terephthalate. Flame-retardant insulating layer 44 is a layer for bonding resin sheet 5 for the flexible flat cable or shield layer 12 to base layer 42 while ensuring flame retardancy, pressure resistance, deterioration resistance, and the like of flexible flat cable 100, and is formed of, for example, a thermoplastic resin material. As flame-retardant insulating layer 44, for example, a thermoplastic polyester resin containing a phosphorus-based flame retardant or a nitrogen-based flame retardant can be used. Anchor coat layer 46 for bonding base layer 42 and flame-retardant insulating layer 44 is provided between base layer 42 and flame-retardant insulating layer 44. As anchor coat layer 46, any material can be used. For example, a urethane-based anchor coat material obtained by mixing an isocyanate-based curing agent with polyurethane as a main agent can be used.

The pair of covering sheets 40 cover shield layers 12 and the outer surfaces of resin sheets 5 for the flexible flat cable at portions where shield layers 12 are not attached. In addition, each of covering sheets 40 has a larger width in the conductor parallel direction than the widths of resin sheets 5 for the flexible flat cable and the widths of shield layers 12. In other words, both end portions (hereinafter referred to as both side end portions) of covering sheets 40) in the conductor parallel direction extend outward with respect to both side end portions of resin sheets 5 for the flexible flat cable and both side end portions of shield layers 12. Moreover, the entire surfaces of both side end portions of resin sheets 5 for the flexible flat cable and both side end portions of shield layers 12 are covered with a pair of such extended covering sheets 40. Furthermore, both side end portions of base layers 42 included in the pair of covering sheets 40 are bonded to each other through flame-retardant insulating layers 44 and anchor coat layers 46. As described above, since the pair of covering sheets 40 are bonded to each other at both side end portions in the conductor parallel direction, it is possible to prevent both side end portions of covering sheets 40 from being peeled off.

Figure 5:
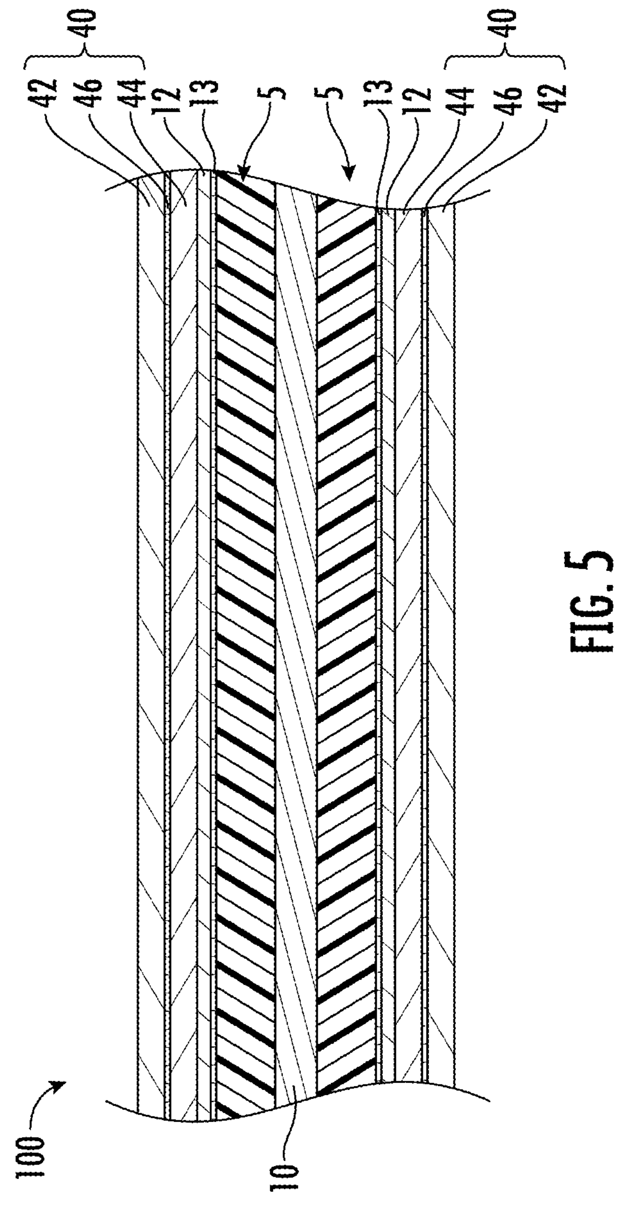
FIG. 5 is a cross-sectional view taken along line A-A of the flexible flat cable in FIG. 2.

FIG. 5 is a longitudinal cross-sectional view of flexible flat cable 100 taken along line A-A. As shown in FIG. 5, the pair of covering sheets 40 are bonded to the outer surfaces of the pair of shield layers 12. In addition, in flexible flat cable 100, flat rectangular conductors 10 are exposed at both ends in the longitudinal direction (not shown), and are directly inserted into and connected to connecting members (not shown).

[Method of Manufacturing Flexible Flat Cable]

As an example of a method of manufacturing a flexible flat cable, in the method for manufacturing flexible flat cable 100 shown in FIG. 2, it is preferable that resin sheet 5 for the flexible flat cable and shield layer 12 are bonded to each other in advance through adhesive layer 13. Adhesive layer 13 and shield layer 12 can be bonded to resin sheet 5 for the flexible flat cable by thermocompression bonding. First, resin sheets 5 for the flexible flat cable to which shield layers 12 are bonded through adhesive layers 13 are disposed on both surface sides of the parallel arranged surfaces of flat rectangular conductors 10. Next, the pair of resin sheets 5 for the flexible flat cable to which shield layers 12 are bonded and between which flat rectangular conductors 10 arranged in parallel at predetermined intervals are interposed are pressed using a pair of laminate rollers. Then, resin sheets 5 for the flexible flat cable are bonded to each other by thermocompression bonding. By the thermocompression bonding, resin sheets 5 for the flexible flat cable are filled between the plurality of flat rectangular conductors 10, and resin sheets 5 for the flexible flat cable on the front and back surface sides are bonded to each other. Thus, resin sheet 5 for the flexible flat cable on the front surface side and resin sheet 5 for the flexible flat cable on the back surface side are integrated with the plurality of flat rectangular conductors 10. The heating temperature in the thermocompression bonding is, for example, about 80° C. to 200° C.

Next, covering sheets 40 are disposed on both outer surface sides of the upper and lower shield layers 12 with a predetermined distance between a pair of laminating rollers which are opposed to each other and press against each other. Then, the pair of covering sheets 40 are pressed with the pair of laminating rollers while shield layers 12 are interposed between covering sheets 40 to bond covering sheets 40 and shield layers 12 to each other, thereby manufacturing flexible flat cable 100.

As described above, flexible flat cable 100 includes the plurality of flat rectangular conductors 10 arranged in parallel, the pair of resin sheets 5 for the flexible flat cable layered on both sides of the parallel arranged surfaces of the plurality of flat rectangular conductors 10, the pair of shield layers 12 in contact with the outer surfaces of the pair of resin sheets 5 for the flexible flat cable 5 through adhesive layers 13, and the pair of covering sheets 40 covering the outer surfaces of the pair of shield layers 12. The pair of resin sheets 5 for the flexible flat cable have a relative dielectric constant of 2.3 or less at 25° C. and 10 GHZ, a dielectric loss tangent of 0.0014 or less, and a tensile elastic modulus of 40 MPa to 450 MPa. Flexible flat cable 100 includes resin sheets 5 for the flexible flat cable having good dielectric characteristics as well as excellent flexibility and dimensional stability, and thus has excellent dielectric characteristics, and is flexible and excellent in bending performance.

OTHER EMBODIMENTS

It should be understood that the embodiments disclosed herein are illustrative and non-restrictive in all respects. The scope of the present disclosure is not limited to the configurations of the embodiments, and is defined by the appended claims. The scope of the present disclosure is intended to include all modifications within the meaning and scope equivalent to the appended claims.

Figure 6:
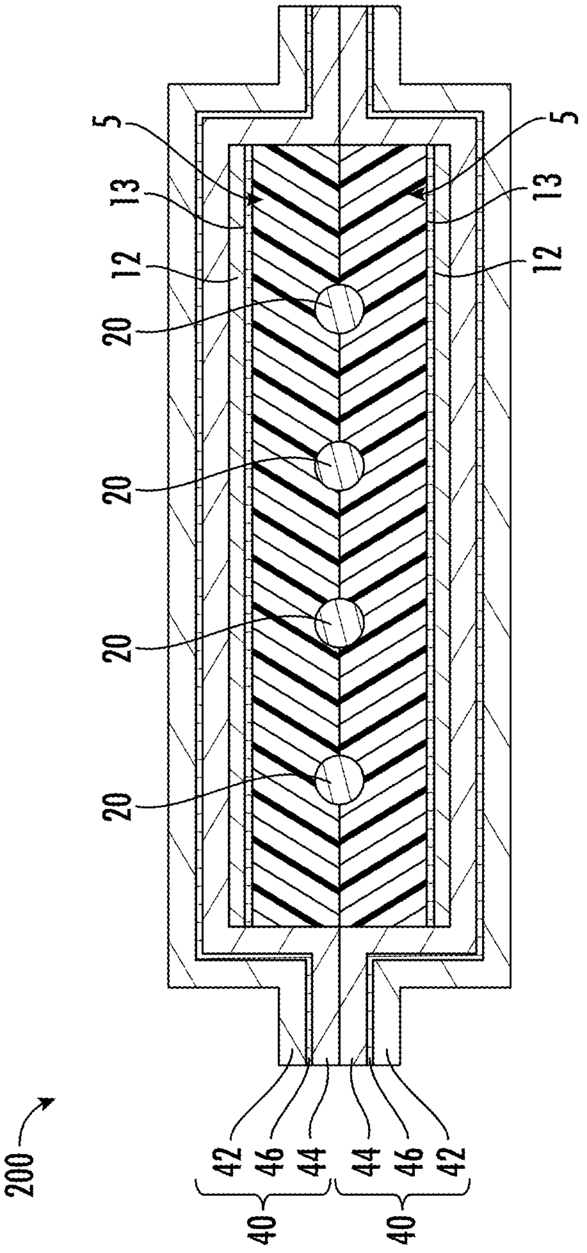
FIG. 6 is a schematic cross-sectional view of the flexible flat cable according to another embodiment of the present disclosure in the plane perpendicular to the longitudinal direction of the flexible flat cable.

In the flexible flat cable of the embodiment described above, the flat rectangular conductors having substantially flat rectangular cross sections are used as the conductors, but the cross sectional shapes of the conductors are not particularly limited. Round conductors having circular cross sections may be used. For example, a flexible flat cable 200 shown in FIG. 6 includes a plurality of round conductors 20 arranged in parallel, a pair of resin sheets 5 for the flexible flat cable, a pair of shield layers 12 in contact with the pair of resin sheets 5 for the flexible flat cable on the outer surface sides through adhesive layers 13, and a pair of covering sheets 40 covering the outer surfaces of the pair of shield layers 12.

The resin sheet for the flexible flat cable of the embodiment describe above includes three layers of the shield-layer-side insulating layer, the base insulating layer, and the conductor-side insulating layer. However, the resin sheet for the flexible flat cable may have a configuration in which the shield-layer-side insulating layer or the conductor-side insulating layer is not included. In addition, the resin sheet for the flexible flat cable may have a single-layer structure including only the base insulating layer.

The resin sheet for the flexible flat cable can be manufactured by dissolving resin compositions each forming the shield-layer-side insulating layer, the base insulating layer, and the conductor-side insulating layer in solvents to obtain solutions, applying the solutions containing the respective resin compositions to the inner surface of the adhesive layer in this order, and drying the solutions.

Example

The present invention will be described in more detail with reference to the following examples, but the present invention is not limited to the following examples.

<Resin Sheets for Flexible Flat Cable No. 1 to No. 15>

Resin sheets for a flexible flat cable of No. 1 to No. 15 were formed by the following procedure.

First, the materials described in Table 1 were used to form a shield-layer-side insulating layer, a base insulating layer, and a conductor-side insulating layer in each of resin sheets for flexible flat cables of No. 1 to No. 15. The melting point, relative dielectric constant, and dielectric loss tangent of each of the materials are shown in Table 1. As reactor TPOs (1) to (3), reactor TPOs having polypropylene blocks were used. As the TPO other than the reactor TPO, a dynamic crosslinking type was used. PP (1) is a random polypropylene, and PP (2) is a homopolypropylene.

In each of the resin components, 0.1 parts by mass of an antioxidant and 0.1 parts by mass of a copper inhibitor were added to 100 parts by mass of each of the resin components. As the antioxidant, 3,9-bis [2-{3-(3-tert-butyl-4-hydroxy-5-methylphenyl) propionyloxy}-1,1-dimethylethyl]-2,4,8,10-tetraoxaspiro [5,5]undecane having a semi-hindered phenol structure was used. In addition, decamethylene dicarboxylic acid disalicyloyl hydrazide was used as the copper inhibitor.

The shield-layer-side insulating layer, the base insulating layer, and the conductor-side insulating layer were simultaneously formed by coextrusion using a multilayer T-die while the extrusion amounts of the materials for the respective layers were adjusted so that each of the layers has the average thickness shown in Table 1. Then, three-layered sheets of No. 1 to No. 4, No. 8, and No. 11 to No. 15, or two-layered sheets of No. 5 to No. 7, No. 9, and No. 10, in which these layers were integrated, were manufactured to obtain resin sheets for flexible flat cables of No. 1 to No. 15.

[Evaluation of Resin Sheet for Flexible Flat Cable]

The obtained resin sheets for flexible flat cables of No. 1 to No. 15 were evaluated for a tensile elastic modulus, a relative dielectric constant, and a dielectric loss tangent. The evaluation methods are shown below. In addition, the evaluation results are shown in Table 1.

(Tensile Elastic Modulus)

The tensile elastic modulus was measured by a tensile tester in accordance with JIS-K-7161-1:2014 “Plastics-Determination of tensile properties-Part 1: General principles”.

(Relative Dielectric Constant and Dielectric Loss Tangent)

The relative dielectric constant and the dielectric loss tangent at 25° C. and 10 GHZ were measured by a cavity resonator perturbation method using a cavity resonator manufactured by AET, Inc.

(Flexibility)

Based on the measured tensile elastic modulus, the resin sheets for flexible flat cables were evaluated into three levels of A, B, and C. The evaluation criteria for flexibility were as follows. The level of A or B in the evaluation was considered acceptable.

A: The tensile elastic modulus is less than 300 MPa.

B: The tensile elastic modulus is 300 MPa to 450 MPa.

C: The tensile elastic modulus is more than 450 MPa.

(Heat Deformation Resistance)

The heat deformation rate residue was measured by thermomechanical analysis (TMA) in accordance with JIS-K7197 (1991). In the measurement, a test indenter having a diameter of 0.5 mm and a load of 10 g was used. The evaluation criteria for heat deformation resistance were as follows. The level of A or B in the evaluation was considered acceptable.

A: The heat deformation rate residue at 100° C. is 60% or more.

B: The heat deformation rate residue at 100° C. is 40% or more and less than 60%.

C: The heat deformation rate residue at 100° C. is less than 40%.

TABLE 1

| | Resin sheet for flexible flat cable Resin component | | | | Mass ratio | | | | | | | |
|---|---|---|---|---|---|---|---|---|---|---|---|---|
| | Material | Melting point [° C.] | Relative dielectric constant | Dielectric loss tangent | No. 1 | No. 2 | No. 3 | No. 4 | No. 5 | No. 6 | No. 7 | No. 8 |
| Shield layer-side insulating layer | Maleic acid-modified PP (1) | 135 | 2.2 | 0.0005 | 100 | — | 100 | 100 | 100 | — | 100 | 100 |
| | Maleic acid-modified PP (2) | 165 | 2.2 | 0.0005 | — | 100 | — | — | — | — | — | — |
| | PP(1) | 133 | 2.2 | 0.0002 | — | — | — | — | — | 100 | — | — |
| | Reactor TPO (1) | 125 | 2.2 | 0.0001 | 100 | — | 60 | 100 | 100 | — | — | — |

TABLE 1-continued

| | | | | | | | | | | | | |
|---|---|---|---|---|---|---|---|---|---|---|---|---|
| Base insulating layer | Reactor TPO (2) | 160 | 2.2 | 0.0003 | — | 100 | — | — | — | 60 | — | — |
| | Reactor TPO (3) | 140 | 2.1 | 0.0002 | — | — | 40 | — | — | 30 | — | — |
| | TPO other than reactor TPO | 160 | 2.3 | 0.0005 | — | — | — | — | — | — | — | — |
| | Linear low-density PE | 119 | 2.2 | 0.0002 | — | — | — | — | — | — | 100 | — |
| | PP(2) | 163 | 2.2 | 0.0002 | — | — | — | — | — | — | — | 100 |
| | Maleic acid-modified PP (3) | 135 | 2.2 | 0.0005 | — | — | — | — | — | 10 | — | — |
| Conductor-side insulating layer | Reactor TPO (1) | 125 | 2.2 | 0.0001 | 60 | — | 60 | 60 | — | — | — | 60 |
| | Reactor TPO (2) | 160 | 2.2 | 0.0003 | — | 90 | — | — | — | — | — | — |
| | Reactor TPO (3) | 140 | 2.1 | 0.0002 | 30 | — | 30 | 30 | — | — | — | 30 |
| | Maleic acid-modified PP (3) | 135 | 2.2 | 0.0005 | 10 | 10 | 10 | 10 | — | — | — | 10 |
| | PP(1) | 133 | 2.2 | 0.0002 | — | — | — | — | — | — | — | — |
| Average thickness | Shield-layer-side insulating layer [μm] | | | | 5 | 5 | 5 | 15 | 5 | 5 | 5 | 5 |
| | Base insulating layer [μm] | | | | 240 | 240 | 240 | 220 | 245 | 245 | 245 | 240 |
| | Conductor-side insulating layer [μm] | | | | 5 | 5 | 5 | 15 | — | — | — | 5 |
| Resin sheet evaluation | Tensile elastic modulus [MPa] | | | | 329 | 411 | 212 | 346 | 331 | 251 | 491 | 1749 |
| | Relative dielectric constant (10 GHz) | | | | 2.2 | 2.2 | 2.2 | 2.2 | 2.2 | 2.2 | 2.2 | 2.2 |
| | Dielectric loss tangent (10 GHz) | | | | 0.0002 | 0.0003 | 0.0002 | 0.0003 | 0.0002 | 0.0004 | 0.0002 | 0.0002 |
| | Flexibility | | | | B | B | A | B | B | A | C | C |
| | Heat deformation resistance | | | | A | A | A | A | A | A | A | A |
| Tensile elastic modulus of shield-layer-side insulating layer [MPa] | | | | | 880 | 1220 | 880 | 880 | 880 | 440 | 880 | 880 |

| | Resin sheet for flexible flat cable Resin component | | | | | | | | | | |
|---|---|---|---|---|---|---|---|---|---|---|---|
| | | Melting point | Relative dielectric | Dielectric loss | Mass ratio | | | | | | |
| | Material | [° C.] | constant | tangent | No. 9 | No. 10 | No. 11 | No. 12 | No. 13 | No. 14 | No. 15 |
| Shield layer-side insulating layer | Maleic acid-modified PP (1) | 135 | 2.2 | 0.0005 | — | — | 100 | 100 | 100 | — | 100 |
| | Maleic acid-modified PP (2) | 165 | 2.2 | 0.0005 | — | — | — | — | — | — | — |
| | PP(1) | 133 | 2.2 | 0.0002 | — | — | — | — | — | 100 | — |
| | Reactor TPO (1) | 125 | 2.2 | 0.0001 | 100 | — | — | — | 60 | 60 | 60 |
| Base insulating layer | Reactor TPO (2) | 160 | 2.2 | 0.0003 | — | — | — | 25 | — | — | — |
| | Reactor TPO (3) | 140 | 2.1 | 0.0002 | — | — | 100 | 75 | 40 | 40 | 40 |
| | TPO other than reactor TPO | 160 | 2.3 | 0.0005 | — | 100 | — | — | — | — | — |
| | Linear low-density PE | 119 | 2.2 | 0.0002 | — | — | — | — | — | — | — |
| | PP(2) | 163 | 2.2 | 0.0002 | — | — | — | — | — | — | — |
| | Maleic acid-modified PP (3) | 135 | 2.2 | 0.0005 | — | — | — | — | — | — | — |

TABLE 1-continued

| | | | | | | | | | | | |
|---|---|---|---|---|---|---|---|---|---|---|---|
| Conductor-side insulating layer | Reactor TPO (1) | 125 | 2.2 | 0.0001 | — | — | 60 | 60 | 60 | — | 60 |
| | Reactor TPO (2) | 160 | 2.2 | 0.0003 | — | — | — | — | — | — | — |
| | Reactor TPO (3) | 140 | 2.1 | 0.0002 | — | — | 30 | 30 | 30 | — | 30 |
| | Maleic acid-modified PP (3) | 135 | 2.2 | 0.0005 | — | — | 10 | 10 | 10 | — | 10 |
| | PP(1) | 133 | 2.2 | 0.0002 | — | — | — | — | — | 100 | — |
| Average thickness | Shield-layer-side insulating layer [μm] | | | | — | — | 5 | 5 | 10 | 10 | 20 |
| | Base insulating layer [μm] | | | | 250 | 250 | 240 | 240 | 450 | 450 | 25 |
| | Conductor-side insulating layer [μm] | | | | — | — | 5 | 5 | 10 | 10 | 20 |
| Resin sheet evaluation | Tensile elastic modulus [MPa] | | | | 320 | 240 | 35 | 48 | 213 | 208 | 408 |
| | Relative dielectric constant (10 GHz) | | | | 2.2 | 2.3 | 2.2 | 2.2 | 2.2 | 2.2 | 2.2 |
| | Dielectric loss tangent (10 GHz) | | | | 0.0001 | 0.0005 | 0.0002 | 0.0003 | 0.0002 | 0.0002 | 0.0003 |
| | Flexibility | | | | B | A | A | A | A | A | B |
| | Heat deformation resistance | | | | A | A | C | B | A | A | A |
| Tensile elastic modulus of shield-layer-side insulating layer [MPa] | | | | | — | — | 880 | 880 | 880 | 440 | 800 |

<Flexible Flat Cables No. 16 to No. 30>

Flexible flat cables of No. 16 to No. 30 were manufactured by the following procedure. As shown in Table 2, each of flexible flat cables of No. 16 to No. 30 was manufactured by forming an insulating layer using one of the resin sheets for the flexible flat cables of No. 1 to No. 15.

As the conductors, 20 flat rectangular conductors each having a thickness of 35 μm and a width of 0.3 mm were used. The resin sheets for the flexible flat cables shown in Table 2 were disposed on the front and back surface sides of the flat rectangular conductors so as to be in contact with the 20 conductors arranged in parallel at intervals, and subjected to thermocompression bonding to each other. The thermocompression bonding was performed using a heat roll at a temperature of 140° C. to 160° C. By this thermocompression bonding, the conductor-side insulating layers of the resin sheets for the flexible flat cables on the front and back surface sides were softened and filled into the gaps between the conductors of the 20 flat rectangular conductors, and bonded to each other.

Next, the adhesive layers and the shield layers were layered on the resin sheets for the flexible flat cables by thermocompression bonding at 120° C. For the shield layers, soft aluminum having an average thickness of 10 μm was used. For the adhesive layers, EVA having an average thickness of 5 μm was used.

Then, the resin sheets for the flexible flat cables to which the adhesive layers and the shield layers were bonded were covered with three-layered covering sheets each including a base layer, a flame-retardant insulating layer, and an anchor coat layer to obtain flexible flat cables of No. 16 to No. 30. For the base layer, a polyethylene terephthalate film having an average thickness of 12 μm was used. A resin layer having an average thickness of 30 μm was layered as the flame-retardant insulating layer. The resin layer for the flame-retardant insulating layer was formed of a copolyester resin to which aluminum phosphinate and melamine cyanurate were added. A resin layer having an average thickness of 3 μm was layered as the anchor coat layer. The resin layer for the anchor coat layer was formed of polyurethane to which an isocyanate-based curing agent was added.

[Evaluation of Flexible Flat Cable]

The obtained flexible flat cables of No. 16 to No. 30 were evaluated for conductor adhesive strength and bending performance. The evaluation methods are shown below. The evaluation results are shown in Table 2.

(Conductor Adhesive Strength of Conductor-Side Insulating Layer)

The conductor adhesive strength of the conductor-side insulating layer was measured by the following procedure. An opening was formed in either one of the resin sheets for the flexible flat cables on the front surface side and on the back surface side for exposing a conductor, and flexible flat cables of No. 16 to No. 30 were made by the above-described method. Then, the conductor adhesive strength was measured by a 180 degree peel test in which the conductor at the opening was peeled off in a 180-degree direction. The 180 degree peel test was performed in accordance with JIS-K6854-2 (1999). The value of the conductor adhesive strength (N/cm) in the 180 degree peel test described in Table 2 is a value obtained by dividing the value obtained by the test by the width of the test piece. The flexible flat cable having a conductor adhesive strength value of zero is a flexible flat cable of a type in which the conductor and the insulating layer do not have adhesiveness, with emphasis on the ease of peeling off the insulating layer.

(Bending Performance)

After each of the flexible flat cables was folded in two, the radius of curvature at the folded portion was measured. Then, based on the radius of curvature, the bending performance of the flexible flat cables was evaluated into three levels of A, B, and C. The evaluation criteria of the bending performance were as follows. The level of A or B in the evaluation was considered acceptable.

A: The curvature radius is less than 2.5 mm.

B: The curvature radius is 2.5 mm or more and less than 3.5 mm.

C: The curvature radius is 3.5 mm or more.

(Pitch Precision of Flat Rectangular Conductor)

The precision of the pitch (interval between the flat rectangular conductors) of the 20 flat rectangular conductors arranged between the resin sheets for the flexible flat cables after the thermocompression bonding was evaluated. The pitch precision of the flat rectangular conductors was evaluated into two levels of A and B based on a product standard of =0.05 mm. The level of A in the evaluation was considered acceptable.

A: The pitch precision of the flat rectangular conductors is less than +0.05 mm.

B: The pitch precision of the flat rectangular conductors is +0.05 mm or more.

TABLE 2

| Flexible flat cable | | | | | | | | | | | | | | | | |
|---|---|---|---|---|---|---|---|---|---|---|---|---|---|---|---|---|
| | | Test No. | | | | | | | | | | | | | | |
| | | No. 16 | No. 17 | No. 18 | No. 19 | No. 20 | No. 21 | No. 22 | No. 23 | No. 24 | No. 25 | No. 26 | No. 27 | No. 28 | No. 29 | No. 30 |
| Resin sheet for flexible flat cable | | No. 1 | No. 2 | No. 3 | No. 4 | No. 5 | No. 6 | No. 7 | No. 8 | No. 9 | No. 10 | No. 11 | No. 12 | No. 13 | No. 14 | No. 15 |
| Average thickness [μm] | | 505 | 505 | 505 | 505 | 505 | 505 | 505 | 505 | 505 | 505 | 505 | 505 | 895 | 895 | 140 |
| Cable evaluation | Bending performance | B | B | A | B | B | A | C | C | B | A | A | A | A | A | A |
| | Conductor adhesive strength [N/cm] | 6 | 5 | 6 | 10 | 0 | 14 | 0 | 4 | 0 | 0 | 10 | 10 | 6 | 0 | 10 |
| Cable workability | Pitch precision | A | A | A | A | A | A | A | A | A | A | B | A | A | A | A |

As shown in Table 1, each of the resin sheets for the flexible flat cables of No. 1 to No. 6, No. 9, No. 10, and No. 12 to No. 15 which included the base insulating layer containing a thermoplastic olefinic elastomer as a primary component and having an average thickness of 20 μm to 450 μm and had a relative dielectric constant at 25° C. and 10 GHz of 2.3 or less, a dielectric loss tangent of 0.0014 or less, and a tensile elastic modulus of 40 MPa to 450 MPa exhibited good dielectric characteristics, flexibility, and dimensional stability based on thermal deformation resistance. On the other hand, each of the resin sheets for the flexible flat cable of No. 7 and No. 8 which included the base insulating layer containing no thermoplastic olefinic elastomer and had a tensile elastic modulus of more than 450 MPa exhibited good dielectric characteristics, but poor flexibility. Furthermore, No. 11 which had a tensile elastic modulus of less than 40 MPa was inferior in dimensional stability based on thermal deformation resistance.

As shown in Table 2, the flexible flat cables of No. 16 to No. 21, No. 24, No. 25, and No. 27 to No. 30 respectively including the resin sheets for the flexible flat cables of No. 1 to No. 6, No. 9, No. 10, and No. 12 to No. 15 had good bending performance and dimensional stability based on the pitch precision of the flat rectangular conductors. On the other hand, the flexible flat cables of No. 22 and No. 23 respectively including the resin sheets for the flexible flat cables of No. 7 and No. 8 were inferior in bending performance. The flexible flat cable of No. 26 including the resin sheet for the flexible flat cable of No. 11 was inferior in dimensional stability based on the pitch precision of the flat rectangular conductors. Furthermore, the flexible flat cables of No. 16 to No. 19 and No. 27 to No. 30 respectively including the resin sheets for the flexible flat cables of No. 1 to No. 4 and No. 12 to No. 15 each having the base insulating layer containing thermoplastic olefinic elastomer as the primary component and the conductor-side insulating layer exhibited good conductor adhesive strength as well.

The above results show that the flexible flat cable according to the present disclosure has good dielectric characteristics and dimensional stability, and is flexible and excellent in bending performance, because the resin sheet for the flexible flat cable according to the present disclosure is included.

REFERENCE SIGNS LIST

2 shield-layer-side insulating layer
3 base insulating layer
4 conductor-side insulating layer
5 resin sheet for a flexible flat cable
10 flat rectangular conductor
12, 22 shield layer
13, 23 adhesive layer
20 round conductor
40 covering sheet
42 base layer
44 flame-retardant insulating layer
46 anchor coat layer
100, 150, 200 flexible flat cable

The invention claimed is:

1. A resin sheet for a flexible flat cable, the resin sheet comprising one or a plurality of insulating layers and being layered between a plurality of conductors arranged in parallel and a shield layer layered on an outer surface side of parallel arranged surfaces of the plurality of conductors, wherein the resin sheet has a relative dielectric constant of 2.3 or less at 25° C. and 10 GHz, and a dielectric loss tangent of 0.0014 or less, wherein the resin sheet has a tensile elastic modulus of 40 MPa to 450 MPa, wherein the resin sheet includes a base insulating layer containing a thermoplastic olefinic elastomer as a primary component, and wherein an average thickness of the base insulating layer is 20 μm to 450 μm.

2. The resin sheet for the flexible flat cable according to claim 1, wherein the thermoplastic olefinic elastomer is a reactor thermoplastic olefinic elastomer having a polypropylene block.

3. The resin sheet for the flexible flat cable according to claim 1, further comprising:

a shield-layer-side insulating layer layered on a surface of the base insulating layer, the surface being on a side of the shield layer, wherein the shield-layer-side insulating layer has a tensile elastic modulus of 400 MPa or more.

4. The resin sheet for the flexible flat cable according to claim 1, further comprising:

a conductor-side insulating layer layered on a surface of the base insulating layer, the surface being on a side of the conductors, wherein the conductor-side insulating layer has an average thickness of 3 μm to 20 μm.

5. A flexible flat cable comprising:

a plurality of conductors arranged in parallel;

a shield layer layered on an outer surface side of parallel arranged surfaces of the plurality of conductors; and the resin sheet for the flexible flat cable according to claim 1, the resin sheet being layered between the parallel arranged surfaces of the plurality of conductors and the shield layer, wherein the resin sheet for the flexible flat cable and surfaces of the plurality of conductors are in contact with each other.

* * * * *